United States Patent [19]

Kinoshita et al.

[11] Patent Number: 4,761,155

[45] Date of Patent: * Aug. 2, 1988

[54] TENSIONER FOR WRAPPING CONNECTOR TRANSMISSION DEVICE FOR INTERNAL COMBUSTION ENGINE

[75] Inventors: Yusuke Kinoshita, Fujimi; Junichi Araki, Niiza; Itsuo Iwai, Shinminato; Eiichi Ichihara, Shakujii; Michio Sato, Tokyo; Nobuo Anno, Urawa, all of Japan

[73] Assignees: Honda Giken Kogyo Kabushiki Kaisha, Tokyo; Tanaka Machine Industries Co., Ltd., Toyama, both of Japan

[*] Notice: The portion of the term of this patent subsequent to Jun. 23, 2004 has been disclaimed.

[21] Appl. No.: 840,831

[22] Filed: Mar. 18, 1986

[30] Foreign Application Priority Data

Mar. 19, 1985 [JP] Japan .................................. 60-54775
Mar. 19, 1985 [JP] Japan .................................. 60-57779
Mar. 22, 1985 [JP] Japan .................................. 60-58062

[51] Int. Cl.$^4$ .............................................. F16H 7/12
[52] U.S. Cl. .................................. 474/110; 474/104; 474/118; 474/133
[58] Field of Search ............... 474/110, 117, 118, 133, 474/135, 136, 138, 139, 148; 251/48; 248/562, 565; 188/314; 267/8 R, 136, 137; 180/231

[56] References Cited

U.S. PATENT DOCUMENTS

| | | | |
|---|---|---|---|
| 2,893,255 | 7/1959 | Bayliss | 188/314 |
| 3,142,193 | 7/1964 | Polko et al. | 474/110 |
| 4,094,205 | 6/1978 | Cook | 474/110 |
| 4,190,025 | 2/1980 | Wahl | 474/110 |
| 4,277,240 | 7/1981 | Kraft | 474/110 |
| 4,283,181 | 8/1981 | Sproul | 474/110 |
| 4,283,182 | 8/1981 | Kraft | 474/110 |
| 4,284,178 | 8/1981 | Tomita et al. | |
| 4,411,638 | 10/1983 | Wilson | |
| 4,464,146 | 8/1984 | Arthur | 474/133 |
| 4,466,803 | 8/1984 | Wilson | 474/138 |
| 4,674,996 | 6/1987 | Anno et al. | 474/133 |

FOREIGN PATENT DOCUMENTS

| | | |
|---|---|---|
| 0030169 | 6/1981 | European Pat. Off. . |
| 0053954 | 6/1982 | European Pat. Off. . |
| 0035851 | 4/1981 | Japan .................................. 474/110 |
| 202039 | 12/1982 | Japan . |
| 121344 | 7/1983 | Japan . |
| 208251 | 11/1984 | Japan . |
| 197807 | 7/1978 | Netherlands . |
| 02308 | 7/1983 | PCT Int'l Appl. . |
| 1205368 | 9/1970 | United Kingdom . |
| 1303549 | 1/1973 | United Kingdom . |
| 1419560 | 12/1975 | United Kingdom . |
| 2065265 | 6/1981 | United Kingdom . |

*Primary Examiner*—Stephen J. Novosad
*Assistant Examiner*—Bruce M. Kisliuk
*Attorney, Agent, or Firm*—Armstrong, Nikaido, Marmelstein & Kubovcik

[57] ABSTRACT

A tensioner acting on and allowing an endless transmission belt, stretched between a driving wheel and driven wheels supported on the body of an internal combustion engine, to run under a constant tension, wherein an oscillating lever supports a tension pulley pressed against a loosening side of the transmission belt and has a base end pivoted on the engine body, and an automatic adjuster connected to a tip end of the lever is supported on a case for a hydraulic pump of the engine. A spacer is interposed between contact portions of the oscillating lever and the engine body, and an outlet of the pump and an oil port of the adjuster are directly communicated. An adjusting screw is provided on the tip end of the oscillating lever and is operatively connected to the upper end of a plunger of the automatic adjuster. An auxiliary spring is further connected to the oscillating lever to assure the transmission belt of the constant tension, and the tension pulley supported on the oscillating lever is pressed against the transmission belt at a location close to the axis of an engine cylinder, that is, almost directly above the driving wheel, to thereby secure a sufficient space for installation of the automatic adjuster outside the pulley.

29 Claims, 7 Drawing Sheets

TENSIONER FOR WRAPPING CONNECTOR TRANSMISSION DEVICE FOR INTERNAL COMBUSTION ENGINE

BACKGROUND OF THE INVENTION

1. Field of the Invention

The present invention relates to a tensioner for a wrapping connector transmission device for an internal combustion engine, in which it is automatically arranged that an endless transmission member as a wrapping connector stretched between a driving wheel and a driven wheel supported on the engine body is adapted to run under a constant tension at all times.

2. Description of the Prior Art

It has been heretofore known in a conventional combustion engine to stretch and wrap an endless transmission member between a driving wheel and a driven wheel and connect an automatic adjuster to a tensioner body which is pressed against the transmission member thereby to allow the transmission member to run under a constant tension at all times (Japanese Utility Model Application Laid-Open No. 202,039/82).

It has also been well known, in an internal combustion engine of the type having a crank shaft connected with a driving wheel and a valve operating cam shaft connected with a driven wheel and further having an endless transmission member stretched between the driving and driven wheels, to urge a tension pulley of a tensioner, supported on the engine body through an oscillating lever, into pressure contact by means of an automatic adjuster against the loosening side of the endless transmission member thereby permitting the transmission member to run under a given tension (Japanese Patent Application Laid-Open No. 208,251/84).

However, conventional tensioners of the mentioned type suffer from such problems that the tension pulley is caused to repeat its oscillating motion along with the oscillating lever by variation in tension of the endless transmission member, and that the pulley is subjected to vibrations of the transmission member to displace in its axial direction showing a tendency of floating up relative to the engine body, and such tendency increases particularly when the engine operates at a high speed.

In addition, in such a tensioner, reaction from the transmission member acts on a pivot portion of the oscillating lever and a supporting portion of the automatic adjuster and, therefore, it is necessary for assuring a predetermined tension to the transmission member efficiently, to increase the rigidity of the pivot portion of the oscillating lever and supporting portion of the automatic adjuster.

Furthermore, when an automatic adjuster for the tensioner is constructed of a hydraulically operated type, a closed loop type and an externally oil replenished type are known to be used. The closed loop type is advantageous in that a passage for replenishing oil from the outside is not required but involves a problem in reliability because of deterioration and leakage of oil sealed in the adjuster. On the other hand, the externally oil replenished type is free of the problem noted above but poses a separate problem in that a passage to replenish the adjuster with oil from the outside is required, which complicates the construction, resulting in a higher cost.

Moreover, if the automatic adjuster is designed to be a forced oil replenishing type, pressure oil is always forcibly fed thereto to make the operation of the adjuster reliable. However, when the engine is out of operation, oil supply to the automatic adjuster is stopped to cause a drop in oil pressure in the adjuster. As a result, when the engine operation is restarted, the operation of the automatic adjuster is delayed in time causing loosening of the transmission member temporarily. This sometimes leads to a jump between the meshing teeth of the transmission member and the driving wheel. If an attempt is made to increase an adjusting allowance of the automatic adjuster in order to avoid a problem, a further problem may arise to inevitably make the automatic adjuster large-sized which increases the cost.

In addition to overcoming the above disadvantages of the prior art, it is required to design a tensioner of the above type in such a manner that it can be easily mounted on an engine body, the whole operation stroke of an automatic adjuster provided on the tensioner can be effectively utilized to increase the adjusting allowance of a transmission member, the work to adjust the stroke can be conducted easily and the automatic adjuster can be made compact, and that in the case where the automatic adjuster is constructed of a hydraulically operated type, any useless stroke can be eliminated from the adjuster and oil ports formed at relative movable parts in the adjuster can be made as small as possible.

Furthermore, it is desired that the space occupied by the whole wrapping connector transmission device not be so increased even with the arrangement of the aforesaid tensioner, the wrapping angle of the transmission member with respect to the driving and driven wheels be increased, and the load applied to their meshing teeth be minimized to enhance the transmission efficiency, thus prolonging the service life of the transmission member.

SUMMARY OF THE INVENTION

It is therefore an object of the present invention to provide a compact tensioner which can overcome those disadvantages noted above inherent to the prior art and at the same time meet various requirements, and which always enables a transmission member to run under a given or more tension force with high efficiency irrespective of the operating condition of the engine.

For achieving the above-described object, according to a first aspect of the present invention, there is provided a tensioner for a wrapping connector transmission device for an internal combustion engine in which an endless transmission member is wrapped around a driving wheel and a driven wheel supported on an engine body, and a tension pulley is pressed against a loosening side of said transmission member to allow the belt to run under a predetermined tension, wherein on said engine body is swingably pivoted an oscillating lever rotatably supporting said tension pulley, and a guide shaft is secured to the body for guiding oscillation of said oscillating lever, and wherein a spacer is interposed between contact portions of a stationary part including said engine body and said guide shaft and a movable part including said tension pulley and said oscillating lever in order to avoid direct contact therebetween.

With the above-described arrangement, the movable part including the tension pulley and the oscillating lever is oscillated through the spacer with respect to the stationary part including the engine body and the guide shaft while avoiding direct contact with the engine body with a reduced oscillating resistance of the oscillating lever. In addition, the tension pulley and the oscillating lever are prevented from an axial floating movement even if they are subjected to the vibration from the transmission member, as a result of which the oscillating lever supporting the tension pulley thereon can always oscillate lightly and smoothly to enhance the transmission efficiency of the wrapping connector transmission device.

According to a second aspect, the present invention provides a tensioner for a wrapping connector transmission device for an internal combustion engine in which an endless transmission member is wrapped around a driving wheel and a driven wheel supported on an engine body and the transmission member is allowed to run under a tension, wherein an oscillating lever is swingably pivoted on the engine body, said oscillating lever being connected with a feed-oil type automatic adjuster which carries a tensioning means which is arranged at a location near a loosening side of said transmission member, said adjuster urging the tensioning means into pressure contact against the loosening side of the member to allow the belt to run under a predetermined tension, said automatic adjuster being supported on a case for an oil pump lubricating said engine.

With this arrangement, the reaction of the tensioning means received from the transmission member can be finally received by the engine body and pump case having a great rigidity through the oscillating lever, and control force of the automatic adjuster can be positively transmitted to the transmission member through the tensioning means to allow the transmission member to run under a constant tension at all times and enhance the transmission efficiency of the wrapping connector transmission device. In addition, the whole tensioner can be made stout and can be precisely operated for a long period of time.

According to a third aspect, the present invention provides a tensioner for a wrapping connector transmission device for an internal combujstion engine in which an endless transmission member is wrapped around a driving wheel and a driven wheel supported on an engine body, and a tensioning means is disposed on a loosening side of said transmission member, said tensioning means being connected with a feed-oil type automatic adjuster, said adjuster causing said tensioning means to be pressed against the loosening side of said transmission member and being automatically operated in response to an occurrence of a variation in the tension force of the transmission member on its loosening side to allow the member to run always under a given tension, wherein a pump case for a hydraulic pump provided on the engine body and an adjuster case for said feed-oil type automatic adjuster are arranged adjacent to each other, and an outlet opening to said pump case and an oil port bored in said adjuster case are placed in direct communication with each other.

With this arrangement, supply of working oil to the feed-oil type adjuster can be effected directly from the hydraulic pump. No piping is necessary. No possible leakage of working oil occurs. The outlet and the oil port are merely bored in the pump case and the adjuster case, respectively. There is required no seal member or just a simple sealing structure. The construction of a feed-oil system to the automatic adjuster is extremely simple as a whole, thus making it possible to reduce the cost.

According to a further aspect, the present invention provides a tensioner for a wrapping connector transmission device for an internal combustion engine in which an endless transmission member is wrapped around a driving wheel and a driven wheel supported on an engine body and is allowed to run under a tension force, wherein on the engine body is swingably pivoted an oscillating lever for supporting a tensioning means disposed on a loosening side of the transmission member, said oscillating lever being connected with a hydraulic automatic adjuster which causes said tensioning means to be pressed against said transmission member to allow the member to run under a given tension, said lever being further connected with an auxiliary spring for biasing said tensioning means toward the transmission member to assure the member with a set tension.

As described above, a hydraulic automatic adjuster is attached to the tensioner whereby a transmission member is permitted to run precisely under a constant tension during the operation of the engine to enhance the transmission efficiency of the wrapping connector transmission device. Even is there is some delay in actuation in the automatic adjuster at the outset of starting of the engine, the auxiliary spring acts on the transmission member to enable it to run under certain tension, which prevents any temporary looseness in the transmission member from occurring.

Furthermore, by providing an auxiliary spring to share a part of the tensioning means for allowing the transmission member to run under constant tension, an adjusting allowance of the transmission member adjusting allowance can be set larger than without the auxiliary spring. The whole tensioner can be designed to be compact.

Moreover, if the automatic adjuster and the auxiliary spring are disposed on opposite sides of the oscillating lever so as to sandwich the lever therebetween, they can take positions free of any interference from each other, thus contributing to compactness of the whole tensioner.

According to a further aspect, the present invention provides a tensioner for a wrapping connector transmission device for an internal combustion engine in which an endless transmission member is wrapped around a driving wheel and a driven wheel supported on an engine body, and a tensioning means is pressed against a loosening side of the transmission member to allow said transmission member to run under a constant tension, wherein said tensioner comprises an oscillating lever pivoted on the engine body, a tensioning means supported on said oscillating lever and a hydraulic automatic adjuster operatively connected to said oscillating lever to allow said transmission member to run under a predetermined tension through said tensioning means, said automatic adjuster comprising a plunger case provided on the engine body, a plunger slidably fitted within said plunger case, a tension spring for biasing the plunger in a direction to project from the case, a high pressure chamber and a check valve for restraining a depression of said plunger, and an extra oil chamber for supplying oil to said high pressure chamber, an adjusting screw being adjustably threaded into said oscillating lever and having one end operatively connected to an upper end of said plunger.

With the above-described arrangement, the automatic adjuster can be effective already from a condition where its plunger is in a most depressed position, which allows the whole operation stroke to be utilized effectively without waste. The adjusting allowance of the transmission member can be increased, and the automatic adjuster itself can be made compact.

Furthermore, the relatively strong tension spring can be easily compressed by turning the adjusting screw while the automatic adjuster is held secured to and supported on the engine body, so that the assemblability of the whole tensioner and the adjusting efficiency of the operation stroke can be considerably enhanced.

According to a still further aspect, the present invention provides a tensioner for a wrapping connector transmission device for an internal combustion engine in which an endless transmission member is wrapped around a driving wheel connected with a crank shaft supported on a lower portion of an engine body and a driven wheel connected with a valve operating cam shaft supported on an upper portion of the engine body, wherein a loosening side of the transmission member is further wrapped around a driven wheel for driving an auxiliary equipment, the driven wheel for auxiliary equipment being supported on the engine body at a location offset to one side of the axis of a cylinder of the engine that, passes through a center of said crank shaft; between said driven wheel for auxiliary equipment and said driving wheel, a tension pulley is arranged almost directly above said driving wheel and is pressed against an outer surface of the loosening side of the transmission member; and externally of said tension pulley, an automatic adjuster is disposed in a space formed between said driving wheel and said driven wheel for auxiliary equipment and is connected to said tension pulley so as to allow the transmission member to run under a given tension force.

With the above-described arrangement, the wrapping angle of the transmission member with respect to the driving wheel and the driven wheel can be increased to reduce a load partly acting on the transmission member and lighten a load imposed on the meshing teeth of the transmission member, thereby increasing the transmission efficiency of the transmission member, prolonging the service life thereof, and reducing operation noises which may be produced by the wrapping connector transmission device.

Also, the automatic adjuster is arranged in a space formed on the loosening side of the transmission member and is rarely protruded outside the confines defined by the outermost edges of the transmission member. Thus, the whole wrapping connector transmission device can be designed further compactly.

The above and other objects, features and advantages of the present invention will be apparent from the description of preferred embodiments which will be hereinafter described in detail with reference to the accompanying drawings.

DESCRIPTION OF THE PREFERRED EMBODIMENTS

A first embodiment will be described hereinafter with reference to FIGS. 1 through 7, in which case, the device according to the present invention is applied to a DOHC 4-cycle internal combustion engine.

Figure 1:
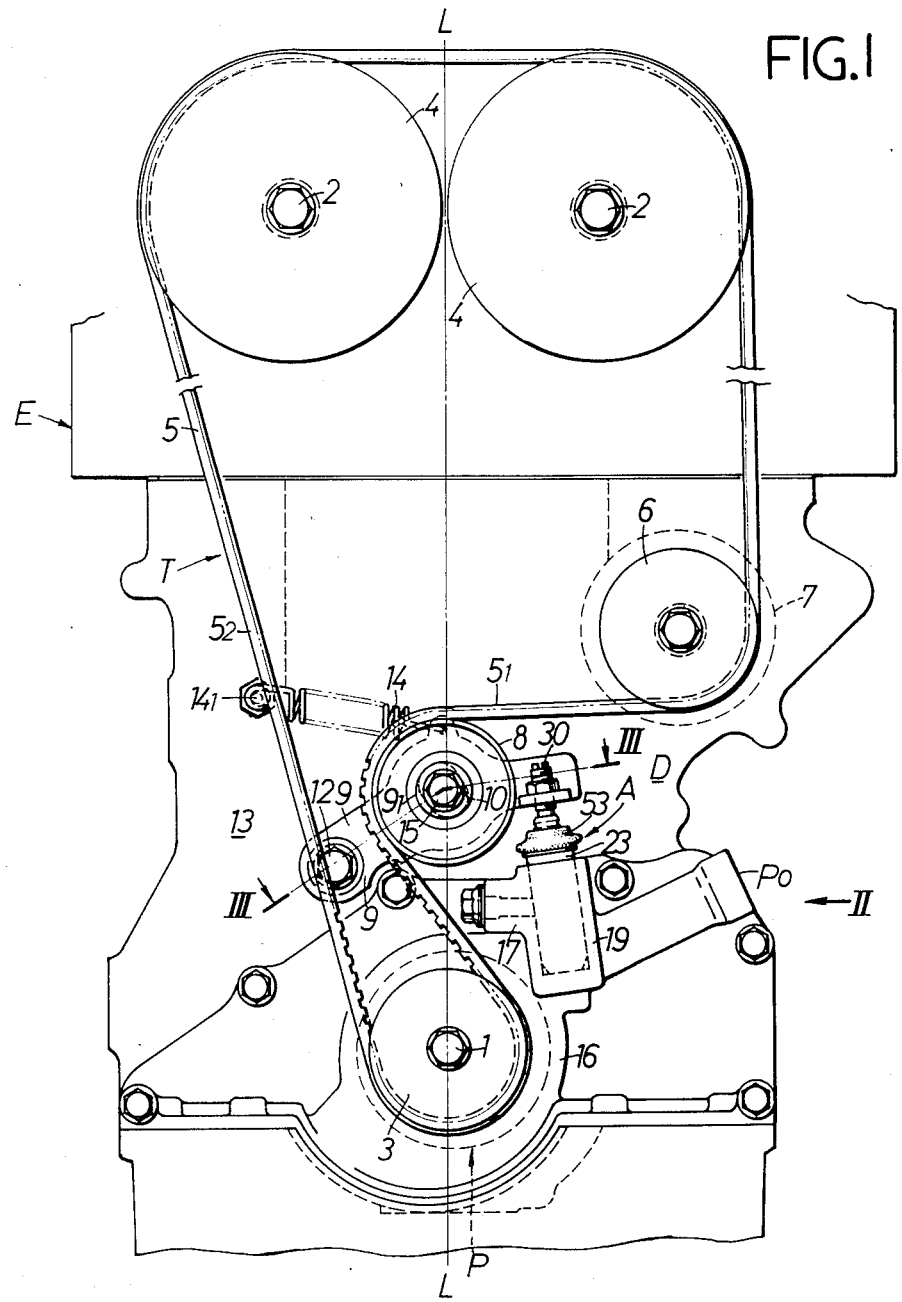
FIG. 1 is a front view of a wrapping connector type timing transmission device for an internal combustion engine according to first embodiment of the present invention.
Figure 2:
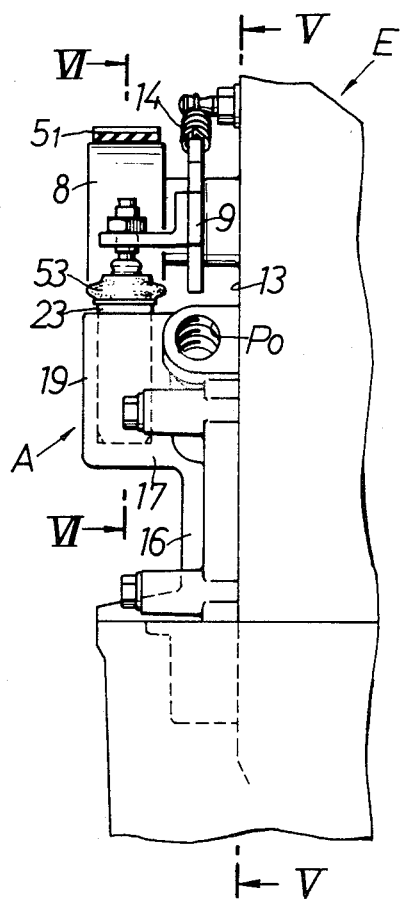
FIG. 2 is a side view as viewed from line II of FIG. 1.

Referring to FIG. 1, on one end surface of the body E of the internal combustion engine is provided a wrapping connector type timing transmission device T for operatively driving a crank shaft 1 and a pair of valve operating cam shafts 2 in a valve operating mechanism. More specifically, the wrapping connector type timing transmission device T is designed so that a transmission belt 5 as a transmission member which is in the form of an endless cog-belt is extended between and wrapped around a driving pulley 3 intergally rotatable with the crank shaft 1 supported on a crank case at the lower portion of the engine body E and driven pulleys 4 integrally rotatable with the pair of valve operating cam shafts 2, respectively, supported on a cylinder head at the upper portion of the engine body E. At a position on one side (on the right-hand in FIG. 1) of an axis L—L of an engine cylinder passing through the center of the crank shaft 1, further driven pulley 6 is wrapped by a halfway portion of the transmission belt 5, and a cooling water pump 7 for the engine body E is driven by the driven pulley 6.

Between the driving pulley 3 and the driven pulley 6 for driving the water pump 7, a tension pulley 8 as a tensioning means is disposed almost immediately above the crank shaft 1 and is pressed in contact with the outer surface on a loosening side $5_1$ of the transmission belt 5, the tension pulley 8 being adapted to allow the belt 5 to run during operation under a constant tension and being rotatably supported through a ball bearing 11 on a pulley shaft portion $9_1$ projected from the middle portion of an oscillating lever 9.

Figure 3:
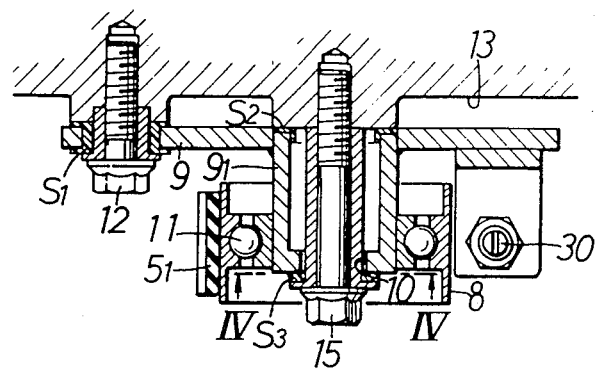
FIG. 3 is an enlarged sectional view taken on line III—III of FIG. 1.
Figure 4:
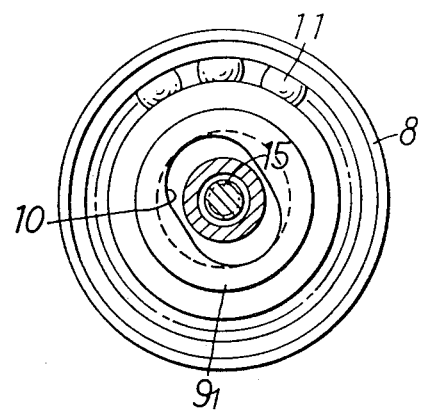
FIG. 4 is a sectional view taken on line IV—IV of FIG. 3.
Figure 5:
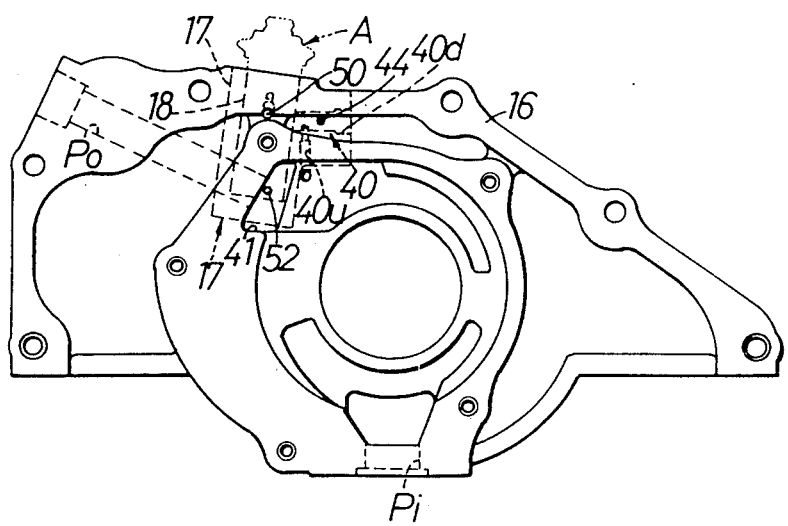
FIG. 5 is a rear view of a pump case taken on line V—V of FIG. 2.

The supporting construction for the tension pulley 8 will be described hereinafter principally with reference to FIGS. 3 and 4. The oscillating lever 9 is vertically oscillatably supported on a support shaft 12 provided on the engine body E, and a first plastic spacer $S_1$ in the form of a grommet is interposed between the support shaft 12 and the oscillating lever 9 whereby direct contact between the engine body E and the oscillating lever 9 is avoided. A pulley shaft $9_1$ carrying the tension pulley 8 rotatably thereon through the ball bearing 11 is integrally provided in the central portion of the oscillating lever 9, the pulley shaft $9_1$ being bored with an arcuate hole 10 having a center on the support shaft 12. The hole 10 is loosely fitted in a guide shaft 15 secured to the engine body E, and the oscillating lever 9 can be vertically oscillated in the range of an angle defined by the arcuate hole 10. A second plastic spacer $S_2$ is mounted on the inner surface of the pulley shaft $9_1$ of the oscillating lever 9. The spacer $S_2$ is interposed between an end wall 13 of the engine body E and the oscillating lever 9. The second spacer $S_2$ and the first spacer $S_1$ provided on the support portion of the oscillating lever 9 cooperate to avoid direct contact between the oscillating lever 9 and the engine body E. Further, a third plastic spacer $S_3$ is interposed between the outer surface of the pulley shaft $9_1$ and the outer end of the guide shaft 15, the third spacer $S_3$ cooperating with the second spacer $S_2$ to prevent an axial floating movement of the tension pulley 8 and the oscillating lever 9 relative to the engine body E.

A forced feed-oil type automatic adjuster A, which will be hereinafter described in detail, is connected to the free end of the oscillating lever 9, and the pressing force of the adjuster A causes the tension pulley 8 to be pressed against the loosening side $5_1$ of the transmission belt 5 through the oscillating lever 9. An auxiliary spring 14 in the form of a tension spring is disposed with a base end thereof supported at $14_1$ on the engine body E and is connected at the other end thereof to the middle portion of the oscillating lever 9, the resilient force of the auxiliary spring 1 causing the oscillating lever 9 to be biased so as to oscillate about the support shaft 12 counterclockwise in FIG. 1 and urging the tension pulley 8 to be auxiliarly pressed against the outer surface of the transmission belt 5 on the loosening side $5_1$.

A well known type hydraulic pump P adapted to forcibly feed lubricating oil or the like to lubricated parts of the body E is connected to the end wall 13 of the engine body E. The hydraulic pump P is directly coupled to and driven by the crank shaft 1. The pump P pumps up oil stored within the engine body E from an inlet passage Pi (FIG. 5) and discharges the oil into an outlet passage Po.

With the above-described arrangement of the driving pulley 3, the driven pulley 6 and the tension pulley 8, the loosening side $5_1$ of the transmission belt 5 is greatly depressed at a position between the driving pulley 3 and the driven pulley 6 inwardly toward a tensioning side $5_2$ of the belt 5 to provide a dead space D therearound. An adjuster case 17 for the feed-oil type automatic adjuster A is integrally cast and molded on the outer surface of the pump case 16 within the space D.

It is to be noted that if the center of the tension pulley 8 is offset toward the tensioning side $5_2$ of the transmission belt 5 from the axis of the cylinder of the engine body E, the dead space D can be enlarged.

Next, the construction of the feed-oil type automatic adjuster A will be described principally with reference to FIGS. 6 and 7. The adjuster case 17 for the automatic adjuster A is integrally formed on an upper part of the outer surface of the pump case 16. A hollow cylindrical housing 19 having an open upper end 18 is formed in the adjuster case 17. A hollow cylindrical plunger case 21 likewise having an open upper end 20 is fitted in the housing 19, and an O-ring 22 is interposed between the upper outer circumferential portion of the plunger case 21 and the inner circumference of the housing 19. A plunger 23 with an upper projection formed into a convergent configuration is fitted slidably and movably up and down within the plunger case 21, and a plug 25 is fitted to an open upper end 24 of the plunger 23. A slipper member 27 is fitted through an O-ring 29 in a depression 26 formed at the upper portion of the plug 25, the slipper member 27 being formed at the top surface thereof with a slipper surface 28. An adjusting screw 30 is adjustably threaded into the free end of the oscillating lever 9 and has a spherical lower end $30_1$ brought into abutment with the slipper surface 28. The plunger 23 defines a high pressure oil chamber 31 at the lower portion of the plunger case 21 and an extra oil chamber 32 at the upper portion thereof.

A valve port 33 is formed through a bottom wall 23d of the plunger 23, and the high pressure oil chamber 31 is brought into communication with the extra oil chamber 32 through the valve port 33. The high pressure oil chamber 31 encases therein a check valve V for openign and closing the valve port 33 and a tension spring 34 for urging the plunger 23 upward. The check valve V comprises a spherical valve body 35 seated on a seat of the valve port 33, a valve cage 36 for encasing the valve body 35, and a valve spring 37 for urging the valve body 35 in a direction of closing the valve.

At a location below the O-ring 22, a feed-oil hole 38 and an oil port 39 which are always communicated with each other are formed through a side wall 21s of the plunger case 21 and a side wall 23s of the plunger 23, the feed-oil hole 38 being brought into communication with a feed-oil passage 40 formed in the adjuster case 17, the oil port 39 being brought into communication with the extra oil chamber 32.

The feed-oil passage 40 is brought into communication with an outlet 41 of the hydraulic pump P. With this arrangement, if the hydraulic pump P connected to the crank shaft 1 is driven as the engine operates, pressure oil from the pump is always forcibly fed to the extra oil chamber 32 through the outlet 41, the feed-oil passage 40, the oil hole 38 and the oil port 39.

Figure 7:
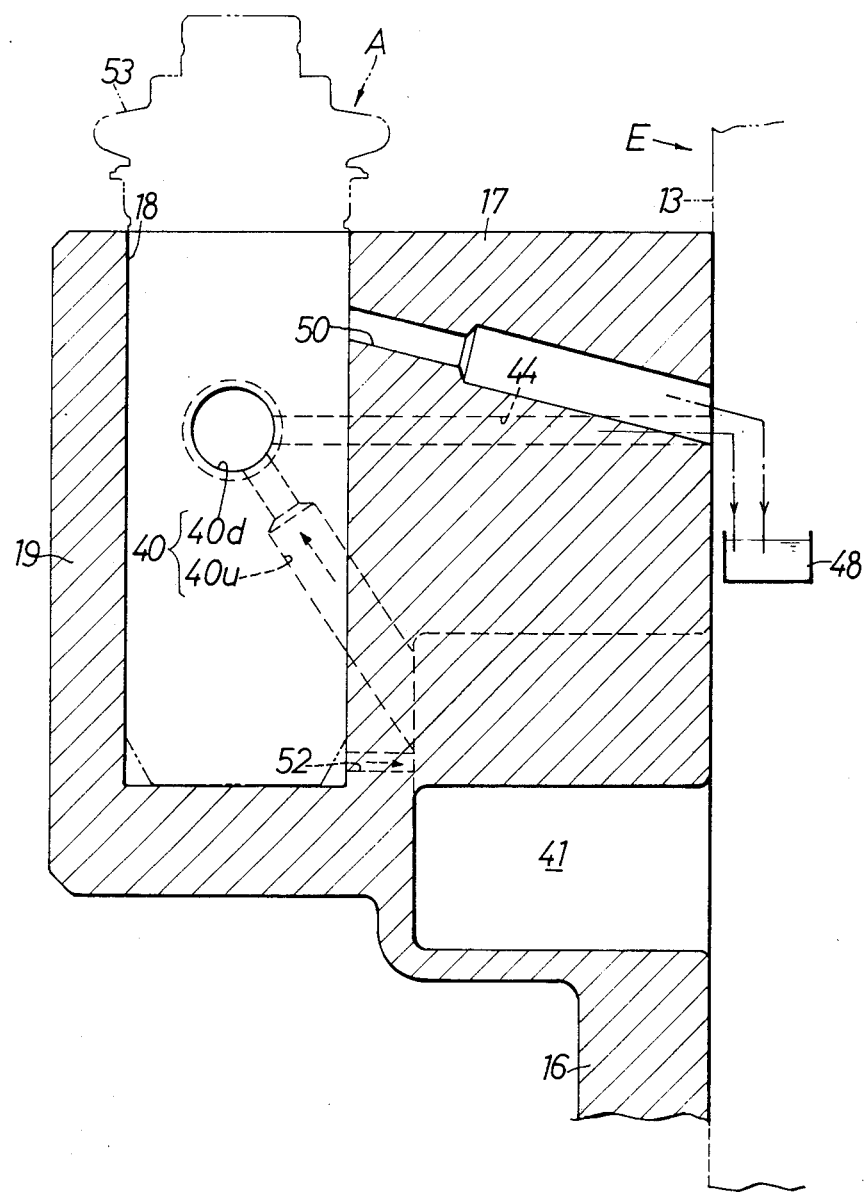
FIG. 7 is a sectional view of an adjuster case taken on line VII—VII of FIG. 6.

As clearly shown in FIG. 7, the feed-oil passage 40 comprises a downstream passage $40d$ on the side of the extra oil chamber 32 and an upstream passage $40u$ on the side of the hydraulic pump P, the downstream passage 40 having its open end closed by a plug 42. A pressure regulator R is encased in the downstream passage $40d$. This regulator R comprises a piston 46 slidably fitted in the downstream passage $40d$ to open and close an oil reservoir communication hole 44 and a spring 47 for urging the piston 46 toward the closed side, whereby when oil pressure in the passage 40 exceeds a predetermined value, the piston 46 is caused to slide in the opening direction against the force of the spring 47 to communicate the oil reservoir communication hole 44 with the passage 40, thus allowing the pressure oil within the passage 40 to return to an oil reservoir 48 disposed at the lower portion of the engine body E.

An annular air extraction passage 51 is formed between the outer circumference of the convergent upper portion of the plunger 23 and the plunger case 21. The extraction passage 51 communicates with the extra oil chamber 32 through a leak passage 56 formed between the fitting surfaces of the open upper end 24 of the plunger 23 and the plug 25. An oil discharge hole 49 opening to the air extraction passage 51 is bored through the side wall 21s of the plunger case 21 at a vertical position between the O-ring 22 and the feed-oil hole 38. The oil discharge 49 is brought into communication with the oil reservoir 48 within the engine body E through an oil discharge passage 50 bored in the plunger case 17.

Oil within the extra oil chamber 32 flows along with any possible trapped-in air into the air extraction passage 51 through the leak passage 56 and is further circulated from the passage 51 into the oil reservoir 48 within the engine body E through the oil discharge hole 49 and the oil discharge passage 50.

Figure 6:
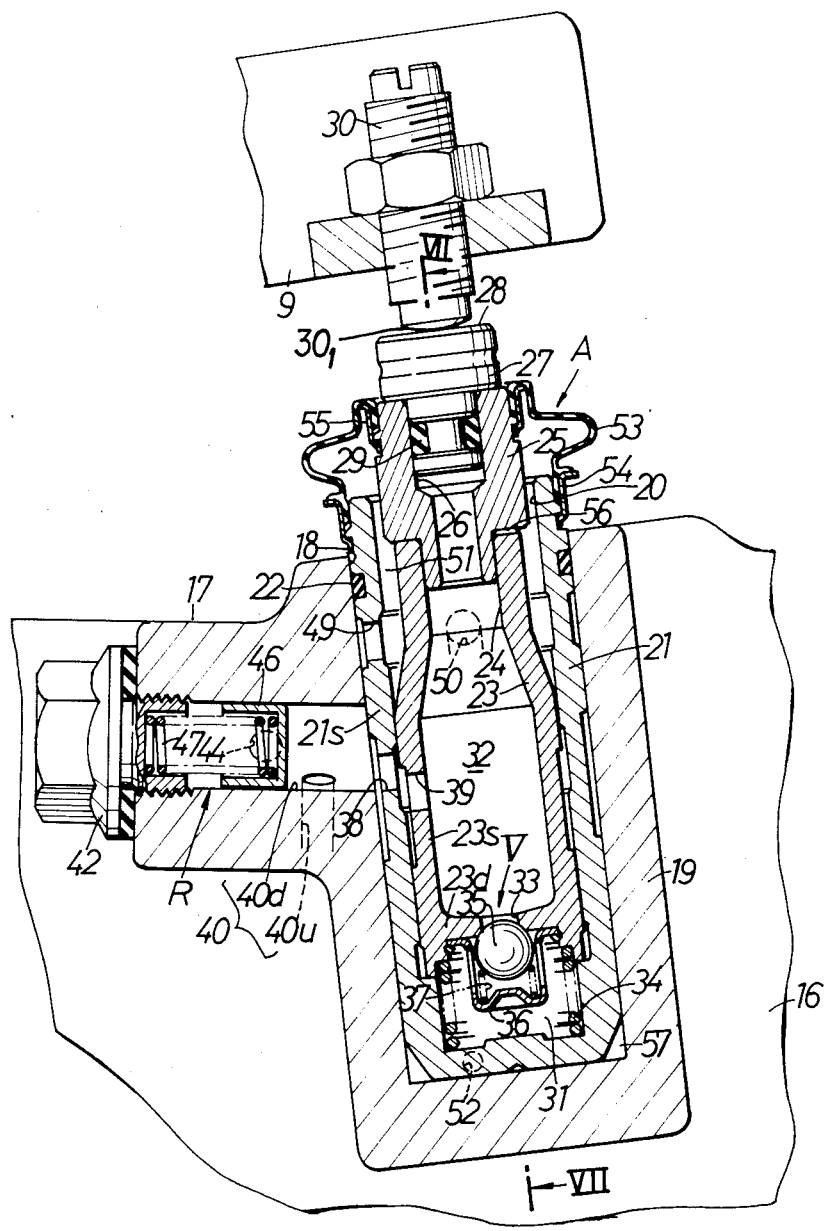
FIG. 6 is an enlarged view taken on line VI—VI of FIG. 2.

Furthermore, as shown in FIG. 6, another air extraction passage 52 for communicating the lower portion of the oil chamber 57 with the outlet 41 of the oil pump P is bored in the bottom of the housing 19. The air extraction passage 52 serves to extract air which may be trapped in the oil chamber 57 when the plunger case 21 is inserted into the housing 19.

A lower end of a boot 53 formed of synthetic resin such as rubber is oil tightly attached by means of a fastening ring 54 to the outer circumferential surface of the upper end of the plunger case 21, whereas an upper end of the boot 53 is reversed and oil tightly attached by means of a fastening ring 55 to the outer peripheral portion of the plug 25. This boot 53 exands and contracts to follow the upward and downward movement of the plunger 23 to provide an oil-tight seal between the plunger case 21 and the plug 25.

Next, the procedure of assembling the tensioner will be described. The auxiliary spring 14 mounted on the engine body E is connected to the oscillating lever 9 which is oscillatably supported on the engine body E by the support shaft 12. The oscillating lever 9 is held generally in its operating position along with the tension pulley 8. On the other hand, in the automatic adjuster A, the tension spring 34 is incorporated into the bottom of the adjuster case 21 and oil is charged thereinto. Next, the plunger 23 with the check valve V mounted on the lower end thereof is inserted into the adjuster case 21 from the top thereof. Then, the spherical lower end $30_1$ of the adjusting screw 30 threaded into the free end of the oscillating lever 9 is placed in abutment against the slipper member 28 provided at the upper end of the plunger 23, which screw 30 is turned in the tightening direction, and the lower end of the plunger 23 is affixed to the bottom of the plunger case 21 while compressing the tension spring 34. Under this condition, the tension pulley 8 is pressed against the loosening side $5_1$ of the transmission belt 5 to place the belt 5 in a stretched state under a predetermined tension, thus terminating the assemblage of the tensioner device.

The operation of the embodiment according to the present invention will be described hereinafter.

When the engine is operated, the rotation of the crank shaft 1 is transmitted to the pair of valve operating cam shafts 2 through the wrapping connector type timing transmission device T comprising the driving pulley 3, the transmission belt 5 and the driven pulleys 4.

The tension pulley 8 disposed on the loosening side $5_1$ of the transmission belt 5 is pressed against the belt 5 by the automatic adjuster A and is automatically actuated in response to variation in tension of the loosening side $5_1$ of the transmission belt 5 to allow the belt 5 to run under a given tension. The auxiliary spring 14 auxiliarly works to urge the tension pulley 8 into pressure contact against the loosening side $5_1$ of the transmission belt 5 by its resilient force.

The oscillating lever 9 supporting thereon the tension pulley 8 repeatedly oscillates up and down about the support shaft 12 so as to follow the variation in tension and vibrations of the transmission belt 5 appearing on its loosening side $5_1$. In this case, however, the oscillating lever 9 comes into contact with the end wall 13 of the engine body E through the first and second plastic spacers $S_1$ and $S_2$, and therefore, the oscillating resistance of the oscillating lever 9 is reduced to permit its smooth and light oscillation. The tension pulley 8 is restricted in its axial floating movement along with the oscillation lever 9 by the cooperation between the second and third spacers $S_2$ and $S_3$.

As shown in FIG. 1, the tension pulley is disposed almost precisely above the crank shaft 1 and pressed against the loosening side $5_1$, of the transmission belt 5 at a position between the driving pulley 3 on the crank shaft 1 and the driven pulley 6 for driving the water pump 7, so that the wrapping angle of the transmission belt 5 with respect to the driving pulley 3 and the driven pulley 6 can be made large.

Next, the operation of the automatic adjuster A will be described in detail.

The same oil as the lubricating oil for the engine is charged beforehand into the high pressure oil chamber 31 within the plunger case 21 and the extra oil chamber 32. A part of the pressure oil from the hydraulic pump P for lubricating the engine connected to the crank shaft 1 is always forcibly fed into the extra oil chamber 32 by passing through the outlet 41, the feed-oil passage 40, the feed-oil hole 38 and the oil port 39. Thus, the extra oil chamber 32 is filled with oil. The oil within the extra oil chamber 32 passes through the leak passage 56 together with any possible air having been trapped in the chamber 32 and passes the air extraction passage 51, from which the oil passes through the oil discharge hole 49 and the oil discharge passage 50 and is circulated into the oil reservoir 48 provided at the lower portion of the engine body E. Accordingly, a feed-oil system provided between the hydraulic pump P and the automatic adjuster A constitutes a closed oil circuit so that lubricating oil can be supplied to the extra oil chamber 32 always during the operation of the engine. In this case, any air trapped in the extra oil chamber 32 passes through the leak passage 56 formed above the chamber 32 and is easily discharged from the air extraction passage 51 to the oil discharge hole 49. Oil flowing between the hydraulic pump P, the automatic adjuster a and the oil reservoir 48 does not leak outside of the engine body E.

When oil pressure within the feed-oil passage 40 exceeds a predetermined value, the piston 46 of the regular R is moved backward against the force of the spring 47, and the oil reservoir communication hole 44 comes into communication with the feed-oil passage 40 to return excess pressure oil within the passage 40 to the oil reservoir 48.

In the automatic adjuster A, the tension spring 34 within the high pressure oil chamber 31 urges by its resilient force pushes the plunger 23 upward and the oscillating lever 9 to oscillate counterclockwise as viewed in FIG. 1 through the adjusting screw 30. With this, the tension pulley 8 inwardly presses the loosening side $5_1$ of the transmission belt 5 thus allowing the transmission belt 5 to run under a given tension. The resilient force of the auxiliary spring 14 also urges the oscillating lever 9 so as to oscillate counterclockwise as viewed in FIG. 1 and, therefore, assists the transmission belt 5 in running under a constant tension.

If the plunger 23 moves upward in response to an elongation of the transmission belt 5, the high pressure oil chamber 31 is reduced in pressure, and therefore, the spherical valve body 35 of the check valve V moves to open the valve port 33 due to a pressure difference between the chamber 31 and the extra oil chamber 32, and an oil is supplied from the extra oil chamber 32 to the high pressure oil chamber 31 through the valve port 33.

During the operation of the wrapping connector type timing transmission device T, when the tension acts on the loosening side $5_1$ of the transmission belt 5 due to a variation in torque acting on the crank shaft 1, the valve operating cam shafts 2 and the like, this tension functions so as to push back the tension pulley 8 and further functions so as to push down the plunger 23 through the oscillating lever 9. With this, oil pressure in the high pressure oil chamber 31 rises so that the valve port 33 is closed by the spherical valve body 35 of the check valve V, this impeding a backflow of oil in the chamber 31 to the extra oil chamber 32. After all, the oil pressure within the high pressure chamber 31 resists the tension imposed by the loosening side $5_1$ of the transmission belt 5 to thereby restrain the backward movement of the tension pulley 8.

In this case, due to the fact that the oil in the sliding clearance between the plunger case 21 and plunger 23 and/or the oil in the high pressure oil chamber 31 contains some air bubbles therein, the plunger 23 is actually sligtly sunk downward whereby the shock caused from tension appearing on the loosening side $5_1$ of the transmission belt 5 can be relieved.

When the tension of the transmission belt 5 on the loosening side $5_1$ is reduced, the plunger 23 is again moved upward by the action of the tension spring 34, and the tension pulley 8 presses the loosening side $5_1$ of the transmission belt 5 through the oscillating lever 9 to again apply certain tension to the transmission belt 5. In this case, if there has been generated any elongation in the transmission belt 5, it can be compensated for also by the tensioner. Then, oil within the extra oil chamber 32 is supplied into the high pressure oil chamber 31 which has been reduced in pressure by upward movement of the plunger 23, as previously mentioned.

In the above-described operation, the pressure oil from the hydraulic pump P is always supplied to the extra oil chamber 32 as mentioned above, and therefore, even if there is some oil leakage from the extra oil chamber 32, such leakage can be immediately compensated for. Moreover, oil is always supplied into the extra oil chamber 32, and thus air trapped into the chamber 32 can be easily extracted, thus providing precise automatic adjustment of a tension degree of the transmission belt as a whole.

In the above-described operation, reaction from the transmission belt 5 acting on the tension pulley 8 further acts on the supporting portion for the oscillating lever 9 and on the supporting portion for the automatic adjuster A. But the oscillating lever 9 and the automatic adjuster A are supported by the engine body E having a great rigidity and the pump case likewise having a great rigidity, respectively, and therefore, a control force of the automatic adjuster A can be positively transmitted to the transmission belt 5 through the tension pulley 8. Pressure oil from the hydraulic pump is directly introduced into the forced feed-oil type automatic adjuster.

During the operation of the engine, that is, during the operation of the hydraulic pump P, the automatic adjuster A receives pressure oil from the hydraulic pump and is operated in the manner as described above. Therefore, both the pressing force of the automatic adjuster A and the resilient force of the auxiliary spring 14 both act on the tension pulley 8 allowing the belt 5 to run under a predetermined tension. However, when the operation of the engine stops, the operation of the hydraulic pump P also stops, and therefore, a supply of pressure oil to the automatic adjuster A also stops, as a consequence of which at the time of re-starting of the engine, feeding of oil to the automatic adjuster A may be delayed sometimes giving rise to a temporary delay in operation of the adjuster A. Suppose now that the resilient force of the auxiliary spring 14 does not act on the transmission belt 5, the transmission belt 5 is loosened to produce a jumping phenomenona between the meshing teeth of the transmission belt 5, and the driving pulley 3 and driven pulley 4, 6 to import shocks to these components, causing possibilities of damaging the teeth of the transmission belt. However, in the present invention, such inconveniences can be avoided because the auxiliary spring 14 is always acting on the transmission belt 5 so as to run under a tension even when the engine is in an inoperative state.

In addition, the auxiliary spring 14 shares a part of the action to cause the transmission belt 5 to run under a tension whereby the load borne on the automatic adjuster can be lightened. As a consequence, even if the automatic adjuster A is located closer toward the oscillating support shaft 12 of the oscillating lever 9, the automatic adjuster A can withstand the load transmitted from the transmission belt 5. Thus, not only the adjusting allowance for the transmission belt 9 can be taken to a larger extent with use of an automatic adjuster A of the same capacity but an oscillating lever 9 having a short length can be used to make the whole tensioner more compact.

Figure 8:
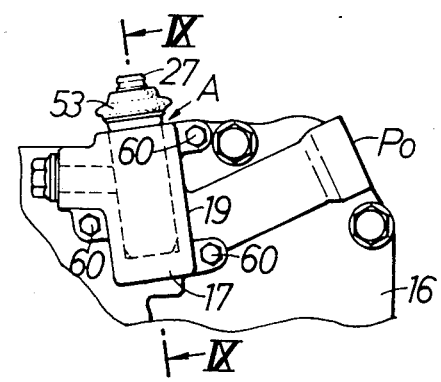
FIG. 8 is a front view of part of the pump case according to the second embodiment.
Figure 9:
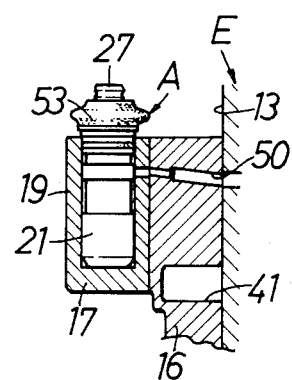
FIG. 9 is a section taken on line IX—IX of FIG. 8.

A second embodiment according to the present invention is shown in FIGS. 8 and 9.

According to this second embodiment, the pump case 16 and the adjuster case 17 are separately formed, and the adjuster case 17 is directly secured to the outer end surface of the pump case 16 by means of a plurality of bolts 60.

In the second embodiment, the maintenance of the automatic adjuster A can be made easy, and the degree of freedom of mounting the automatic adjuster A on the pump case 16 increases to facilitate its layout.

Constructions other than those just mentioned above are the same as those in the above-described first embodiment.

The driving pulley 3, the driven pulley 4, the transmission belt 5 and the tension pulley 8 in the above-described embodiments constitute a driving wheel, a driven wheel, a transmission belt and a tensioning means, respectively, of the present invention. While in the above-described embodiments, a description has been made of the case where the present invention is applied to a belt wrapping type transmission device, it is to be understood that the present invention can also be applied to chain or other wrapping connector type transmission devices.

What is claimed is:

1. A tensioner for a wrapping connector type transmission device for an internal combustion engine, in which an endless transmission member is wrapped around and stretched between driving and driven wheels supported on an engine a body of the internal combustion engine, the tensioner comprising:

an oscillating lever pivotally supported on the engine body and carrying a tensioning means thereon which is pressed against a loosening side of the transmission member;

an oil-replenished type automatic adjuster connected to the oscillating lever to urge the tensioning means against the transmission member for tensioning of the transmission member; and an auxiliary spring connected to the oscillating lever separately from the automatic adjuster and adapted to tension the transmission member via the oscillating lever;

wherein said automatic adjuster is supported on a pump case of a lubricating oil pump for the engine.

2. A tensioner according to claim 1, wherein said autoamtic adjuster has an adjuster case which is formed integral with the pump case.

3. A tensioner according to claim 1, wherein said automatic adjuster has an adjuster which is formed separate from the pump case and is fixedly secured thereto.

4. A tensioner according to claim 1, wherein the automatic adjuster and the auxiliary spring are arranged on opposite sides of the oscillating lever.

5. A tensioner according to claim 4, wherein said tensioning means is carried on an intermediate portion of the oscillating lever, and the automatic adjuster is connected to a free end of the lever, said lever having a base end opposite the free end and being supported on the engine body at the base end.

6. A tensioner according to claim 4, wherein said driving wheel is connected to a crankshaft disposed at a lower position on the engine body while said driven wheel is connected to a valve operating cam shaft disposed at an upper position on the body, a further driven wheel for driving an auxiliary equipment being wrapped by the transmission member and being located on the engine body offset to one side of a vertically extending axis that crosses an axis of the crankshaft, said tensioning means being disposed substantially directly above the driving wheel to provide a space between said driving wheel and said driven wheel for driving the auxiliary equipment, said adjuster being mounted in said space.

7. A tensioner according to claim 6, wherein said driven wheel connected to the valve operating cam shaft comprises two wheels and the cam shaft comprises a pair of cam shafts.

8. A tensioner according to claim 1, wherein said tensioning means is carried on an intermediate portion of the oscillating lever, and the automatic adjuster is connected to a free end of the lever, said lever having a base end opposite the free end and being supported on the engine body at the base end.

9. A tensioner according to claim 1, wherein said driving wheel is connected to a crankshaft disposed at a lower position on the engine body while said driven wheel is connected to a valve operating cam shaft disposed at an upper portion on the engine body, a further driven wheel for driving an auxiliary equipment being wrapped by the transmission member and being located on the engine body offset to one side of a vertically extending axis that crosses an axis of the crankshaft, said tensioning means being disposed substantially directly above the driving wheel to provide a space between said driving wheel and said driven wheel for driving the auxiliary equipment, said adjuster being mounted in said space.

10. A tensioner according to claim 9, wherein said driven wheel connected to the valve operating cam shaft comprises two wheels and the cam shaft comprises a pair of cam shafts.

11. A tensioner according to claim 1, wherein said automatic adjuster is so constructed as to be fed with oil from said lubricating oil pump for the engine.

12. A tensioner for a wrapping connector type transmission device for an internal combustion engine, in which an endless transmission member is wrapped around and stretched between driving and driven wheels supported on an engine body of the engine, the tensioner comprising:

a tensioning means which is pressed against a loosening side of the transmission member; and an oil-replenished type automatic adjuster connected to the tensioning means, said automatic adjuster being automatically operable in response to variation in tension of the loosening side of the transmission member to cause the tensioning means to be pressed against the transmission member so as to allow the transmission member to run under a constant tension;

wherein a pump for feeding oil pressure to the automatic adjuster is disposed in the engine body and has a pump case arranged adjacent an adjuster case of the automatic adjuster, an outlet opened in the pump case and an oil port bored in the adjuster case being directly communicated with each other for allowing direct supply of oil from the pump to the automatic adjuster.

13. A tensioner according to claim 12, wherein said adjuster case is formed integral with the pump case.

14. A tensioner according to claim 13, wherein said automatic adjuster has an extra oil chamber defined therein to communicate with said oil port, said extra oil chamber further communicating with an oil reservoir through an oil discharge passage bored in said pump case and said adjuster case.

15. A tensioner according to claim 13, wherein in said adjuster case is formed a housing for receiving a plunger case and a plunger is slidably fitted in said plunger case, an oil chamber defined by a bottom of the plunger case against the housing, said oil chamber communicating with the atmosphere through an air extraction passage.

16. A tensioner according to claim 15, wherein said air extraction passage leads to the outlet of the pump case.

17. A tensioner according to claim 12, wherein said adjuster case is formed separate from the pump case and is fixedly secured thereto.

18. A tensioner according to claim 17, wherein said automatic adjuster has an extra oil chamber defined therein to communicate with said oil port, said extra oil chamber further communicating with an oil reservoir through an oil discharge passage bored in said pump case and said adjuster case.

19. A tensioner according to claim 17, wherein in said adjuster case is formed a housing for receiving a plunger case and a plunger is slidably fitted in said plunger case, an oil chamber defined by a bottom of the plunger case against the housing, said oil chamber communicating with the atmosphere through an air extraction passage.

20. A tensioner according to claim 19, wherein said air extraction passage leads to the outlet of the pump case.

21. A tensioner according to claim 12, wherein said automatic adjuster has an extra oil chamber defined therein to communicate with said oil port, said extra oil chamber further communicating with an oil reservoir through an oil discharge passage bored in said pump case and said adjuster case.

22. A tensioner according to claim 12, wherein in said adjuster case is formed a housing for receiving a plunger case and a plunger is slidably fitted in said plunger case, an oil chamber defined by a bottom of the plunger case against the housing, said oil chamber communicating with the atmosphere through an air extraction passage.

23. A tensioner according to claim 22, wherein said air extraction passage leads to the outlet of the pump case.

24. A tensioner according to claim 12, wherein said automatic adjuster comprises a plunger case received in the adjuster case, a plunger slidably fitted within the plunger case, a tension spring urging the plunger in a direction projecting from the plunger case, a high pressure chamber in the plunger, and an extra oil chamber in the plunger communicating with an inlet and capable of communicating with the high pressure chamber through a check valve, said extra oil chamber and said check valve cooperating together to restrain a depression of the plunger into the plunger case.

25. A tensioner according to claim 24, wherein said autoamtic adjuster is connected to said tensioning means via an oscillating lever which is pivotally supported on the engine body, an adjusting screw being adjustably threaded into the oscillating lever and being operatively connected to the plunger.

26. A tensioner according to claim 24, wherein said extra oil chamber communicates with an oil discharge passage leading to an oil reservoir, said oil discharge passage being provided in the pump case and the adjuster case.

27. A tensioner according to claim 24, wherein an oil chamber is defined between the adjuster case and a bottom of the plunger case, said oil chamber communicating with the outlet of the pump case.

28. A tensioner for a wrapping connector type transmission device for an internal combustion engine, in which an endless transmission member is wrapped around and stretched between driving and driven wheels supported on an engine body of the engine, the tensioner comprising:

a tensioning means which is pressed against a loosening side of the transmission member for tensioning thereof; and an oil-replenished type automatic adjuster connected to said tensioning means and operates when oil is received from an oil pump to urge the tensioning means against the transmission member, wherein the automatic adjuster has an adjuster case disposed adjacent a pump case of the oil pump, an oil inlet port in the adjuster cae directly communicating with a pump outlet formed in the pump case, said adjuster case receiving a plunger case for a plunger of the automatic adjuster to define an oil chamber between the adjuster case and the plunger case, the oil chamber communicates with the pump outlet via an air extraction passage.

29. A tensioner according to claim 28, wherein said air extraction passage is formed in the adjuster case and the pump case.

* * * * *